Figure 5:
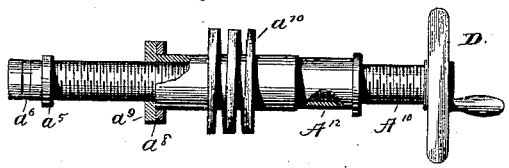
Figure 6:
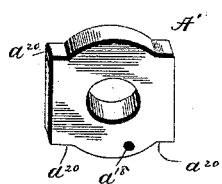
Figure 7:
Figure 8:
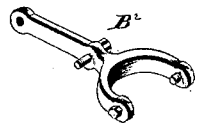

(No Model.)  5 Sheets—Sheet 1.
J. W. JONES.
BOOK BINDER'S AND PRINTER'S DRY PRESSING, SHEET TYING, SMASHING, AND TABLETING MACHINE.
No. 427,426. Patented May 6, 1890.
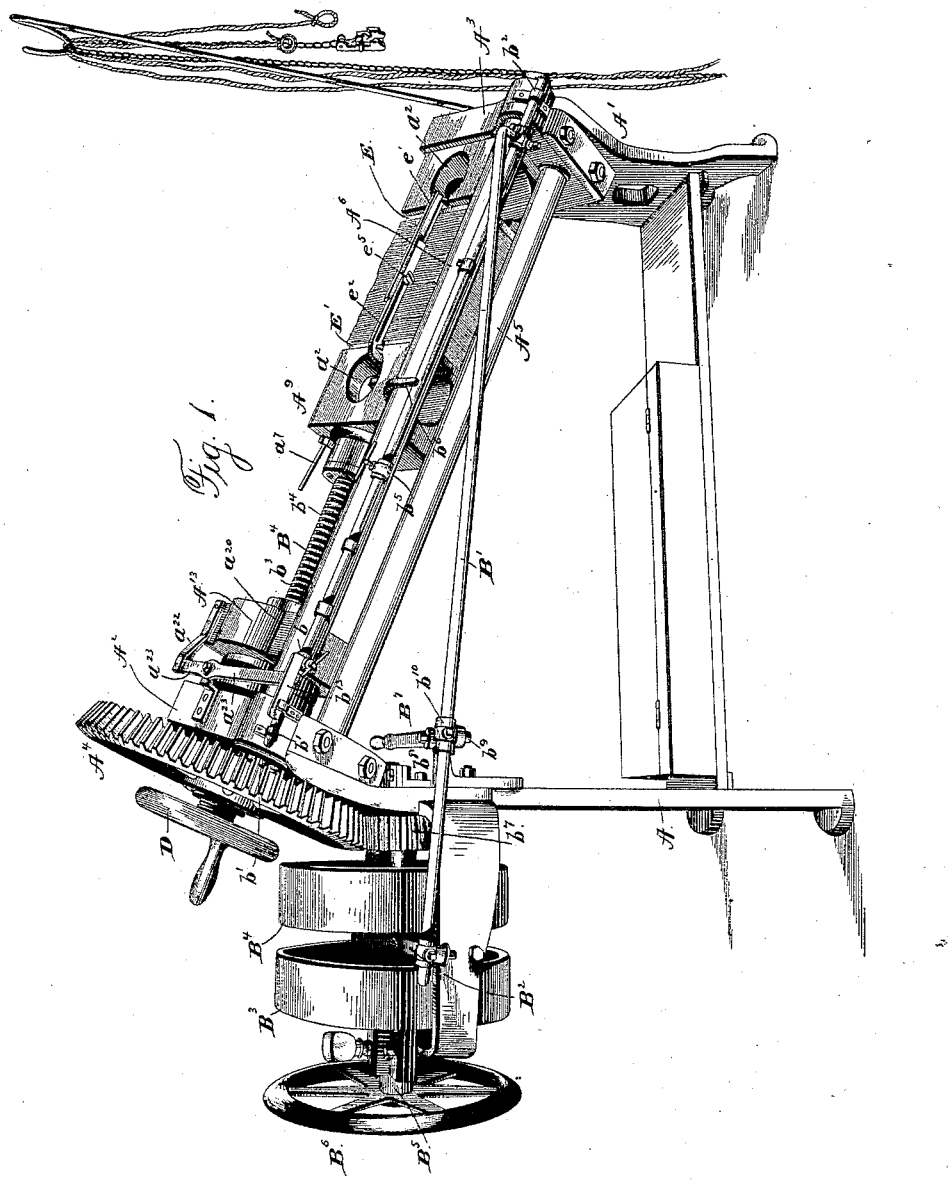

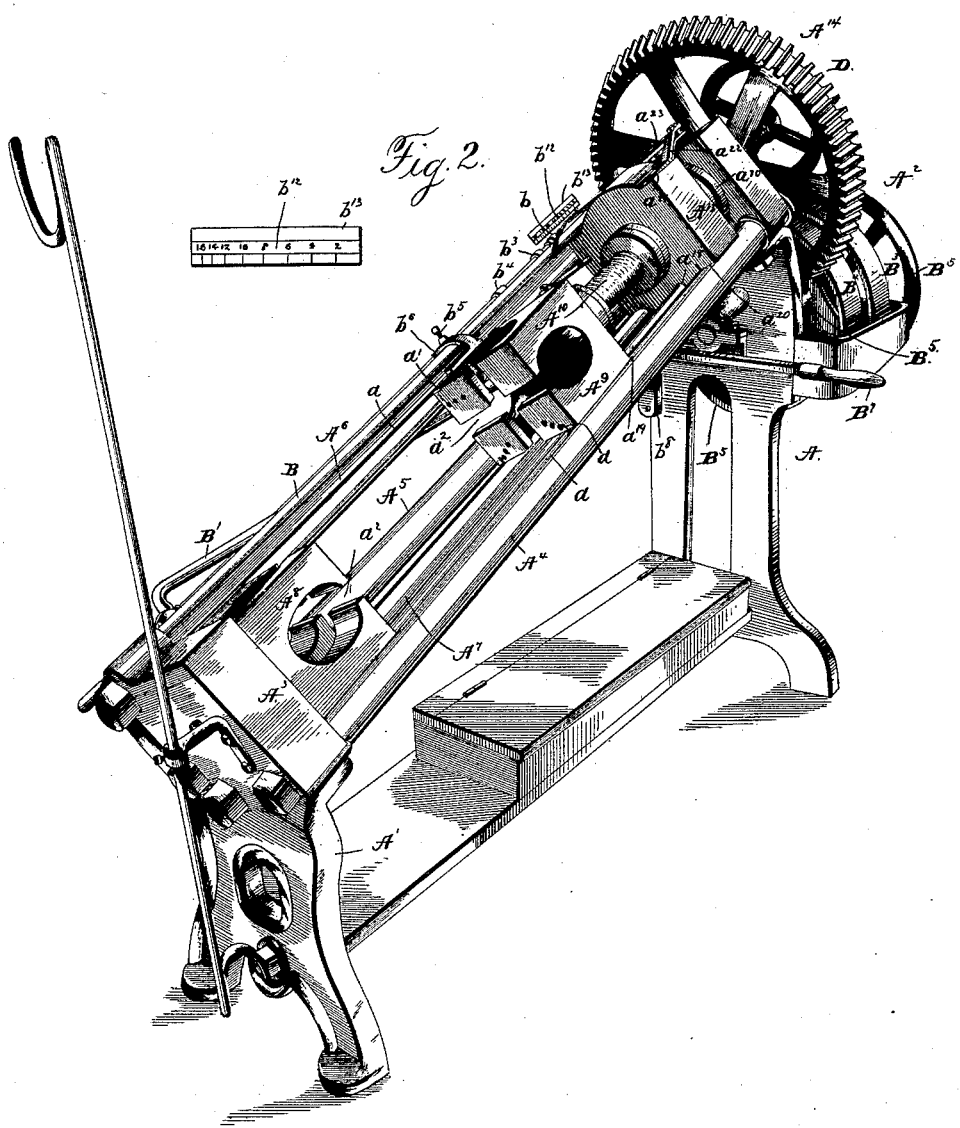

(No Model.) 5 Sheets—Sheet 3.
J. W. JONES.
BOOK BINDER'S AND PRINTER'S DRY PRESSING, SHEET TYING, SMASHING, AND TABLETING MACHINE.
No. 427,426. Patented May 6, 1890.
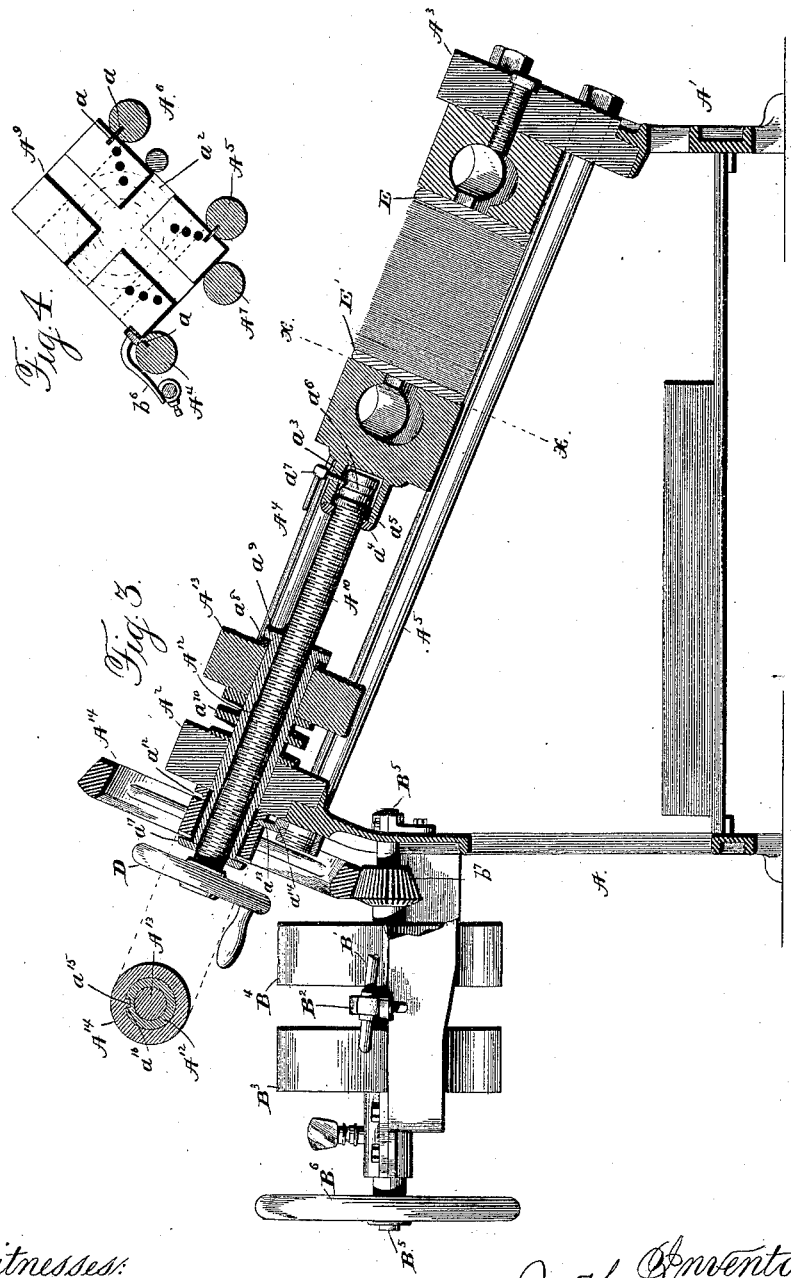

(No Model.) 5 Sheets—Sheet 4.
J. W. JONES.
BOOK BINDER'S AND PRINTER'S DRY PRESSING, SHEET TYING,
SMASHING, AND TABLETING MACHINE.

No. 427,426. Patented May 6, 1890.

Witnesses:
Jas. E. Hutchinson
Howard B. Hyatt

Inventor:
J. W. Jones
per Hallock and Hallock
attys.

(No Model.) 5 Sheets—Sheet 5.
J. W. JONES.
BOOK BINDER'S AND PRINTER'S DRY PRESSING, SHEET TYING, SMASHING, AND TABLETING MACHINE.
No. 427,426. Patented May 6, 1890.
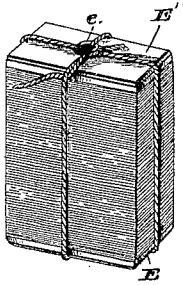
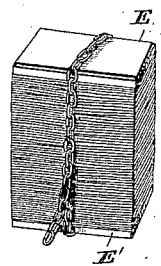
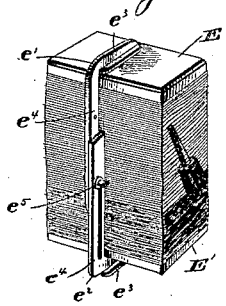
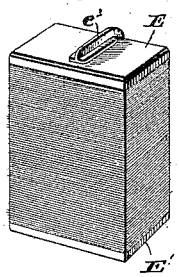
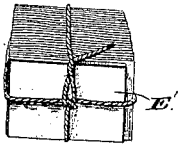
Witnesses:
Jas. E. Hutchinson.
Howard B. Hyatt.
Inventor:
J. W. Jones
per Hallock and Halleck
Attys
THE NORRIS PETERS CO., PHOTO-LITHO., WASHINGTON, D. C.

UNITED STATES PATENT OFFICE.

JOSHUA W. JONES, OF HARRISBURG, PENNSYLVANIA.

BOOK-BINDER'S AND PRINTER'S DRY-PRESSING, SHEET-TYING, SMASHING, AND TABLETING MACHINE.

SPECIFICATION forming part of Letters Patent No. 427,426, dated May 6, 1890.

Application filed July 25, 1889. Serial No. 318,605. (No model.)

*To all whom it may concern:*

Be it known that I, JOSHUA W. JONES, a citizen of the United States, residing at Harrisburg, in the county of Dauphin and State of Pennsylvania, have invented certain new and useful Improvements in Book-Binders' and Printers' Dry-Pressing, Sheet-Tying, Smashing, and Tableting Machines and Appliances; and I do hereby declare the following to be a full, clear, and exact description of the invention, such as will enable others skilled in the art to which it appertains to make and use the same.

My invention relates to that class of machines shown and described in Patent No. 204,741, granted to me June 11, 1878, and in other subsequent patents—to wit, No. 212,947, dated March 4, 1879, and No. 223,355, dated January 6, 1880, reissued March 8, 1881, No. 9,598.

The object of my invention is to furnish a more complete pressing, smashing, and tableting machine than those shown and described in said patents; and the invention consists in adding certain new and useful improvements, which will hereinafter be described in the specification and pointed out in the claims, reference being had to the accompanying drawings, in which—

Figure 1 represents a perspective of the machine; Fig. 2, a perspective looking from the opposite side of the machine and toward the upper end; Fig. 3, a longitudinal section; Fig. 4, a transverse section on line $x$ $x$, Fig. 3; Figs. 5, 6, 7, 8, 9, and 10, details; and Figs. 11, 12, 13, 14, and 15, details showing the several securing devices for the bundles.

A A' represent, respectively, the head and foot standards; $A^2$ $A^3$, the head and foot plates of heavy metal, and $A^4$, $A^5$, and $A^6$ rods for securing the head and foot plates together and for forming the trough or bed. These rods are arranged in a rectangular position with space between, as shown in Fig. 4, on an inclined plane, so that the foot of the machine will be lower than the head. By this means the sheets find an easier lodging and are not liable to tilt or fall over while the trough is being filled, as they incline two ways toward the foot or lower part of the press. If desired, an additional rod $A^7$ may be provided to act as a bottom or rest for the sheets. The rods $A^4$ and $A^6$ are and rod $A^5$ may be provided with longitudinal grooves $a$ for the gibs $a'$ on the compressing-heads $A^8$ and $A^9$. The head $A^8$ is fixed in place by any desired means, and head $A^9$ is movable to and from the fixed head, as will hereinafter be described.

Each head is provided with crossways $a^2$, narrow at the surface and enlarged in the body to permit the hand and forearm to pass through when it is desired to clamp or tie bundles of sheets or paper or composite bundles by any of the devices provided for that purpose, and which may be used to tie or clamp either one, two, or four sides of a bundle.

The top of the movable head $A^9$ has a pocket $a^3$ for the lower end of the pressure-screw $A^{10}$, by which it is moved up and down. The screw is held in place by a flange $a^4$, secured to the head $A^9$, and against which the collar $a^5$ rests. The screw is also provided with an annular depression $a^6$ for a set-screw $a^7$, which rigidly connects the head and screw together when screwed down, and does not interfere with the rotary motion of the screw when not screwed down.

Upon the pressure-screw is a sliding sleeve-nut $A^{12}$, carrying a movable plate $A^{13}$, which rests upon an anti-friction collar $a^8$ on the flange $a^9$ of the nut $A^{12}$. A spring $a^{10}$ interposes between the head-plate $A^2$ and movable plate $A^{13}$, for a purpose hereinafter described, the beveled gear-wheel $A^{14}$ having annular grooves $a^{12}$, in which the ends $a^{13}$ of clips $a^{14}$, secured to the plate $A^2$, project, to prevent the gear-wheel from moving back and forth with the nut when the latter is moved by the screw, so that its position relative to its gear will always remain unchanged, no matter what may be the position of the nut when it is revolved upon its bearing in the plate $A^2$.

The hub is provided with a spline $a^{15}$, which is inserted in the groove $a^{16}$ of nut $A^{12}$, so that the gear-wheel $A^{14}$ will revolve with the nut, which is held against longitudinal displacement by the collar $a^{17}$, secured to its upper end.

The movable plate $A^{13}$ is provided with an opening $a^{18}$ for a guide-rod $a^{19}$, secured to the frame, and with shoulders $a^{20}$, which rest against the frame-rods.

The shoulder $a^{21}$ carries an arm or bracket $a^{22}$, pivoted at its forward end to the rear arm of a lever $a^{23}$, fulcrumed on plate $A^2$ and projecting to the side of the machine opposite to that on which bracket $a^{22}$ is placed to engage with a tappet-collar $b$ on rod B. This rod slides in eyes $b'$ $b^2$, secured to the heads, and is provided with fixed safety-collars $b^3$ and $b^4$ and the adjustable tappet-collars $b$ and $b^5$, which are respectively operated by the lever $a^{23}$ to force the rod downward, and by the tappet $b^6$ on the movable head $A^9$ to force the tappet-rod upward. Near the lower end of rod B is secured a shifting-rod B', which extends to a forked shifting-lever $B^2$ of a clutch between the two reversely-moving pulleys $B^3$ and $B^4$ on shaft $B^5$.

As any desired form of clutch can be used, further description and illustration of the same is unnecessary. The rod B' may also be moved back and forth by the hand-lever $B^7$, fulcrumed on bracket $b^8$, and having its pivoted end slotted to engage with pin $b^9$ in the collar $b^{10}$, fixed to the rod B'.

Shaft $B^5$ is provided at its inner end with a pinion $b^7$, which meshes with the nut-driving beveled gear-wheel $A^{14}$, and at the other end with a large hand-wheel $B^6$, by which extra heavy pressure may be employed when there is no steam-power.

Motion can be imparted to the movable head in two ways. If heavy pressure be desired, the nut is revolved by means of wheel $A^{14}$ and its gearing, and if light pressure or rapidity be desired the screw is revolved in the nut by turning the wheel D. In the first instance the set-screw $a^7$ is screwed down against the end of the pressure-screw to prevent the latter revolving with the nut, and in the second instance the set-screw is withdrawn from contact with the pressure-screw, so that it will be free to turn in the head $A^9$ when revolved in the nut by the hand-wheel D.

The spring or springs $a^{10}$, interposed between the head-plate $A^2$ and movable plate $A^{13}$, may be of any desired strength or number. The spring tends to force the movable plate away from the head-plate, and that tendency is only overcome when the paper has been compressed to a certain extent, when the screw begins to act upon the nut and draws it and the movable plate toward the head-plate. This movement compresses the spring or springs until the compound lever on the movable plate and the head-plate strikes the tappet-collar $b$ and causes the tappet-rod to move downward and operate upon the shifting mechanism to stop the motion of the machine, when the spring reacts to force the movable plate back to its normal position. To permit of this action that part of the nut upon which the wheel $A^{14}$ is journaled is made longer than the hub of the said wheel, which, as before stated, is splined thereon, so that while revolving with the nut it allows the latter to have a longitudinal movement equal to the travel necessary to operate the compound lever against the tappet $b$. This tappet is provided with an index $b^{12}$, which is used in conjunction with a scale $b^{13}$, secured to the head-plate, to indicate the number of tons pressure at which it is desired to operate the tappet-bar to reverse the motion of the machine. By moving the tappet $b$ so that its index will be opposite a certain number the stopping action will not take place until that pressure has been reached.

The scale is graduated to allow for the variations of resistance of the spring, which resistance increases as the number of tons increases and the distance between the signs in the scale gradually decreases from the upper to the lower end.

The operation of the machine is as follows: The matter to be pressed, tied, smashed, or tableted is placed against an end board E upon the frame, which, as before stated, is arranged at such an angle that the sheets, books, or other matter will not cant or fall from the position in which they are placed. When the desired amount of matter has been put upon the frame, a second end board E' is placed at the upper end of the pile. The movable compressing-head $A^9$ is now forced down either by turning the hand-wheel or by revolving the sleeve-nut. If the latter, the nut forces the screw down until the matter is compressed to such an extent that it resists the movement of the head. This resistance causes the nut to move upwardly on the screw until the arm of the compound lever strikes the tappet $b$ on the tappet-rod to operate the clutch. In the meanwhile the bundle has been tied or otherwise secured and ready to be released by the reverse motion of the machine. The machine is again brought to a halt by the tappet-arm $b$, which strikes the tappet-collar $b^5$ on the adjustable tappet-rod, and is ready to receive another supply of matter.

Figure 9:
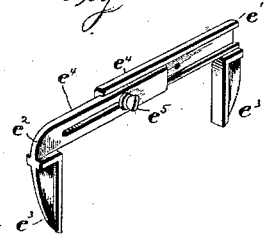
Figure 10:

The means of securing the parts of the bundle together are shown in Figs. 9 to 15, inclusive. In Fig. 11 a rope tie having a ring $e$ is shown. In Fig. 12 is shown a chain tie. In Fig. 15 a loop tie is shown. In Figs. 9, 13, and 14 is shown a clamping device consisting of two angular pieces $e'$ $e^2$. The legs $e^3$ of these pieces clamp the end boards, and the legs $e^4$ are adjustable upon each other, so that the legs $e^3$ may be adjusted to and from each other for the purpose of clamping the same. The legs $e^4$ are tongued and grooved to form guides and prevent lateral displacement, and the legs are secured in place by a set-screw $e^5$.

By using this device three sides of the bundle can be cut or tablets made by pasting the sides, as shown in Fig. 13.

I do not herein claim the trough formed of rods, nor the combination of a trough formed of rods and the movable head, as such construction forms the subject-matter of a separate application, which is a division of this, and filed on the 25th day of November, 1889, Serial No. 331,521.

What I claim as new is—

1. The combination of the stationary compressing-block, a pressure-screw, a sliding nut through which the screw passes, and a movable block having a recess for the end of the screw to revolve in, and a set-screw for locking the screw and block together when the sliding nut is revolved.

2. The combination of the stationary compression-block, the movable compression-block having the set-screw, the pressure-screw having the hand-wheel, and the sliding nut and the mechanism geared to the sliding nut, substantially as shown.

3. The combination of the frame, the stationary block, the movable compression-block, the pressure-screw, the sliding nut having the movable plate, the spring interposed between the plate and frame, the gear-wheel, and the shifting mechanism operated by a compound lever on said movable plate, substantially as shown.

4. The combination of the frame, the stationary and movable compression-blocks, the pressure-screw, the shifting mechanism, a lever secured to the frame and connected with said shifting mechanism, a sliding nut on the screw, a movable plate on said nut and connected with said lever, and a spring interposed between the frame and the movable plate.

5. The combination of the frame, the stationary and movable compression-blocks, the shifting nut carrying a spring-held movable plate, a lever connected with and operated by said plate, and a shifting mechanism operated by said lever, substantially as shown.

6. The combination of the frame, the screw, the nut having a movable plate, a spring interposed between the plate and frame, and a drive-wheel splined on the hub-shifting mechanism, and a lever operated by the movable plate and operating upon the shifting mechanism.

7. The combination of the shifting mechanism having a tappet-rod provided with an adjustable collar and index-finger, a frame having a graduated scale next to the tappet-rod, and a screw-carrying mechanism for operating upon the collar on said tappet-rod.

8. The combination of the frame, the sliding intermediate plate, the resisting springs between the frame and the plate, and mechanism for compressing said spring.

9. The combination of the frame, the screw, the sliding nut having the splined extension, the gear-wheel splined in said extension and having the annular groove in its hub, and clips secured to the frame and having projections extending into said groove to permit the nut to move longitudinally without disturbing the relative position of the wheel to the frame.

10. The combination of the shaft having a hand-wheel on one end, a pinion on the other, and reversely-running pulleys between the clutch and reversing mechanism for the pulleys, and the gear-wheel meshing with the pinion and operating the movable head when the hand-wheel or the pulleys on the shaft are operated upon.

11. The combination of the frame, the pressure-screw, the nut having the collars at its upper and lower end, and the anti-friction collar on the lower end, the intermediate movable plate, the spring interposed between the plate and the frame, and the driving-wheel at the upper end of the nut to which it is splined, substantially as shown.

12. The movable tappet-rod having movable collars and safety-collars between the movable collars, in combination with mechanism for operating said movable collars and shifting mechanism operated by said tappet-rod.

13. The adjustable clamp consisting of two angular sliding sections tongued and grooved and held together by a set-screw.

14. The combination of the movable head, the pressure-screw for moving said head and normally in a fixed position relative to the head and adapted to be turned, and a revolving nut adapted to be held in a stationary position when the screw is revolved.

In testimony whereof I affix my signature in presence of two witnesses.

JOSHUA W. JONES.

Witnesses:
W. D. JONES,
S. B. KNISELY.